United States Patent
Tomlinson

[11] Patent Number: 5,915,947
[45] Date of Patent: Jun. 29, 1999

[54] TIPPET DISPENSER

[76] Inventor: Stephen Jason Tomlinson, 1100 Denise, Ridgecrest, Calif. 93555

[21] Appl. No.: 09/027,732

[22] Filed: Feb. 23, 1998

[51] Int. Cl.$^6$ ..................................................... A01K 97/00
[52] U.S. Cl. ......................... 43/54.1; 43/57.3; 242/419.4; 242/594.3; 242/598.5; 242/404
[58] Field of Search ................................. 43/57.3, 44.98, 43/16, 17, 54.1; 242/404, 404.1, 404.3, 404.4, 419.4, 588.1, 594.3, 598.3, 598.5

[56] References Cited

U.S. PATENT DOCUMENTS

| | | | |
|---|---|---|---|
| 4,528,772 | 7/1985 | Schaefers | 43/54.1 |
| 4,583,315 | 4/1986 | Schreck | 43/54.1 |
| 4,942,691 | 7/1990 | Hwang | 43/54.1 |
| 5,182,877 | 2/1993 | Burchill et al. | 43/54.1 |

Primary Examiner—Michael J. Carone
Assistant Examiner—Judith Nelson
Attorney, Agent, or Firm—Patent & Trademark Services; Thomas Zack; Joseph H. McGlynn

[57] ABSTRACT

A tippet dispenser apparatus with several different spools each of which has a different diameter tippet on it. A common support shaft mounts each of the spools on it and this shaft is supported by a frame structure with two separate leg members. The frame structure has a frame extension used for the tippet holder which permits the different tippet's ends to be held in a separated manner so that they may be dispensed by a user. Also, on the upper part of the frame is a garment or apparel attachment device to permit the tippet dispenser to be attached to a user's clothing.

6 Claims, 2 Drawing Sheets

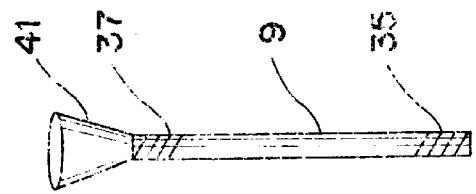
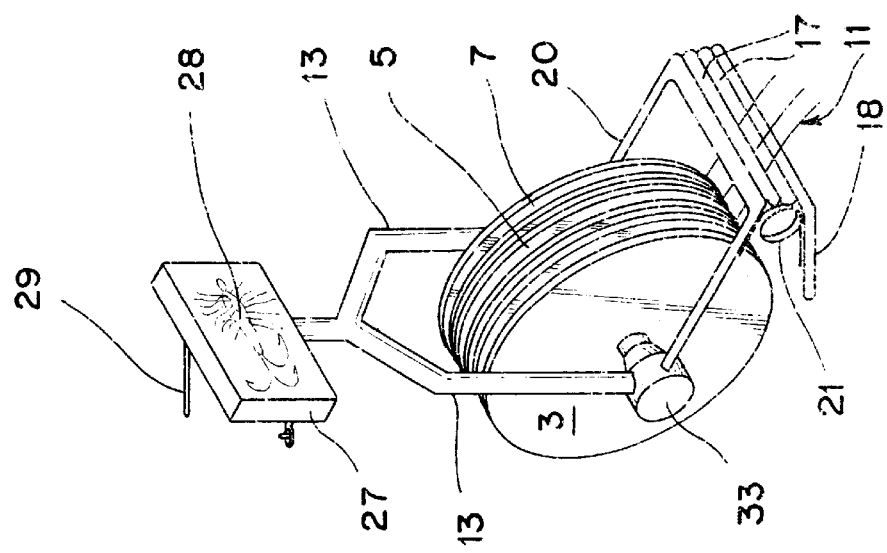
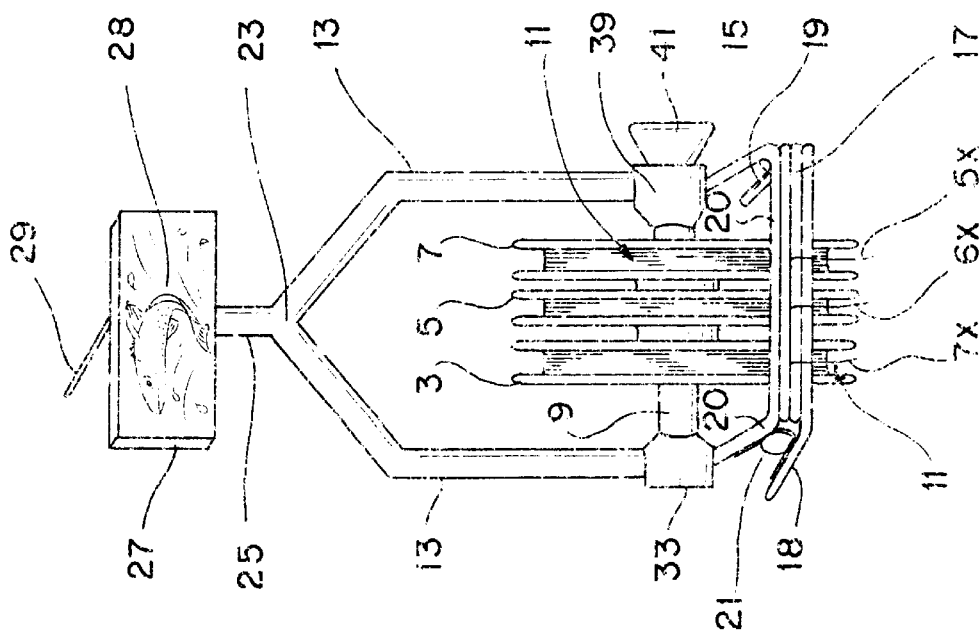

TIPPET DISPENSER

BACKGROUND OF THE INVENTION

Fisherman are familiar with the term tippet used to describe the fishing line segment tied on the end of the leader and at the other end to the fly. The length and diameter of this tippet line varies depending on the needs of the user. Thus, it is common for fisherman or fisher woman to have tippet lines of different diameters on a reel or other storage device which can be dispensed and cut to the desired length. The present invention is directed to one such improved tippet dispenser which can be affixed to a user's garment and dispense tippet stored on a plurality of different spools all as more fully set forth herein.

DESCRIPTION OF THE PRIOR ART

Dispensing and storage devices for fishing lines are known. For example, in U.S. Pat. No. 4,528,772 to Schaefers a transparent hollow tippet tube is used to store tippet material of various diameters wherein the different lines are color coded. A snap is also provided to attach the tube to a user's apparel while fishing.

In the Schreck invention (U.S. Pat. No. 4,583,315) the supply and dispensing device has a plurality of nested reels that touch each other with circumferential friction and a cutter in or on the central hub.

The Hwang fishline storing box invention (U.S. Pat. No. 4,942,691) discloses a box with magnets used to attract hooks attached to different stored length lines.

And in U.S. Pat. No. 5,182,877 to Burchill et al. a fish line stripping basket which can be attached to a body surface of a fisherman is described. This basket is positioned to receive line stripped from a fishing reel. In contrast to these invention and the known prior art, the present invention provides for a tippet dispenser wherein several aligned spools, each containing different diameter tippet, are all mounted on a common central shaft which shaft is supported by a frame with a tippet holder that permits the attachment to a user's apparel as more further set forth in this specification.

SUMMARY OF THE INVENTION

This invention relates to a tippet dispenser having a plurality of separate spools each with different diameter tippet wound on them mounted on a common axis and supported by a frame. The frame has a tippet holder which permits the different tippet's ends to be held and dispensed by a user. Also, on the frame is a garment or apparel attachment device to permit the tippet dispenser to be attached to a user's clothing.

It is the primary object of the present invention to provide for an improved tippet dispenser apparatus.

Another object is to provide for such an apparatus wherein the dispenser may hold and separate the ends of each different diameter tippet located on a separate spool.

These and other objects and advantages of the present invention will become apparent to readers from a consideration of the ensuing description and the accompanying drawings.

BRIEF DESCRIPTION OF THE DRAWINGS

FIG. 1 is a front view of the invention's preferred embodiment.

FIG. 2 is a side perspective view of the FIG. 1 embodiment.

FIG. 3 shows a side view of the common shaft by itself in an upright position.

DESCRIPTION OF THE PREFERRED EMBODIMENT

Figure 5:
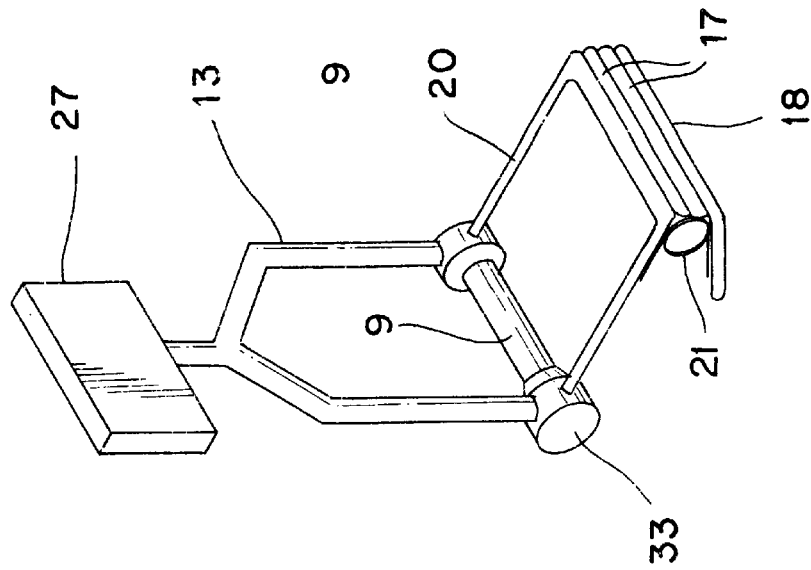
FIG. 5 is a side perspective view of the FIG. 4 frame.

FIG. 1 is a front view of the invention's preferred embodiment. The tippet dispenser for the subject matter of the present invention, As used in this specification the term tippet means a fishing line segment tied at one end to the leader and at the other end to the fly with its hook. Thus, a tippet is an intermediate length of fishing line which can vary in length or cross-sectional diameter, or both, depending upon the needs of the user.

It is common for experienced fisherman to have different cross section diameter tippets on separate spools such as those available under the Powerfex™ lines manufactured by RIO Products of Blackfoot, Id. For example, the 5X tippet made by this company has a 0.006 inch (0.152 mm) cross section diameter and is rated at 4.9 lbs. test strength. The 6X and 7X tippets shown in the first two figures would have corresponding cross sectional diameters.

FIG. 1 shows three such same diameter spools 3,5 and 7 each with a different diameter tippet wound around it. A common central shaft 9 (best shown in FIG. 3) supports each of the three tippet spools or reels through an aligned center hole on each of the individual spools. With this arrangement each spool may rotate separately and independently from the others to permit the dispensing of tippet 11 wound on it by pulling the tippet's exposed free end.

Supporting the ends of the shaft 9 is a U-shaped frame structure 13 into which the ends of the shaft are threaded. Extending outwardly from this main frame 13 is a U-shaped tippet frame holder extension 15 having rubber stoppers 17 whose purpose is to hold and separate the ends of the different diameter tippets 11 from each of the three spools. The rubber stoppers 17 include two identical facing rubber strips each held to one of the two U-shaped frame members 18 and 20 which frame members form the holder extension 15.

Two side mounted spring members 19 and 21 are fixed to and join the two U-shaped frame extension members 18 and 20 together. These same two side springs act to bias the stopper's rubber strips towards each other so that the strips can firmly hold and retain the different diameter lines between them at their ends. This insures that the tippet lines from each spool will be available to a user and separated to allow for their easy access by a user. When a desired length of tippet has been dispensed by pulling its end from a given spool past the rubber stoppers 17 it may be cut by the user to the desired length.

At the upper frame 13 or bight end the two separate leg members forming the frame are joined together at frame juncture 23 from which juncture a common upwardly extending frame segment 25 extends to where it attaches the frame to the decorative button 27. This button may have any type of decorative pattern 28 upon its facing surface with two different types being depicted in FIGS. 1 and 2. At the rear or opposite surface from the facing surface a conventional pin or clip 29 is fixed to the button to permit the frame to be attached to an article of clothing of a user such as his or her vest 31 (shown in dotted line format in FIG. 2).

FIG. 2 is a side perspective view of the FIG. 1 embodiment viewed looking at the spool 3 with the other two spools 5 and 7 aligned on the common shaft 9. The frame end 33 which support one of the ends of this shaft is depicted in this figure. Also shown from a different perspective are the two facing rubber strip making up the tippet holder 17 and one 21 of the two opposite end springs used to bias the strips together and hold the tippet lines.

FIG. 3 shows a side view of the common shaft 9 by itself in an upright position as contrasted to the prone or horizontal shaft disposition in FIG. 1. This metallic shaft has separated two threaded portions 35 and 37 which engage complementarily internal threads located within the two separate enlarged frame ends 33 and 39. The shaft's ends have the threads 35 at one end and the cone shaped enlarged end 41 at the other opposite end. This cone shaped enlarged end 41 is seen extending from the frame's right side in FIG. 1.

Figure 4:
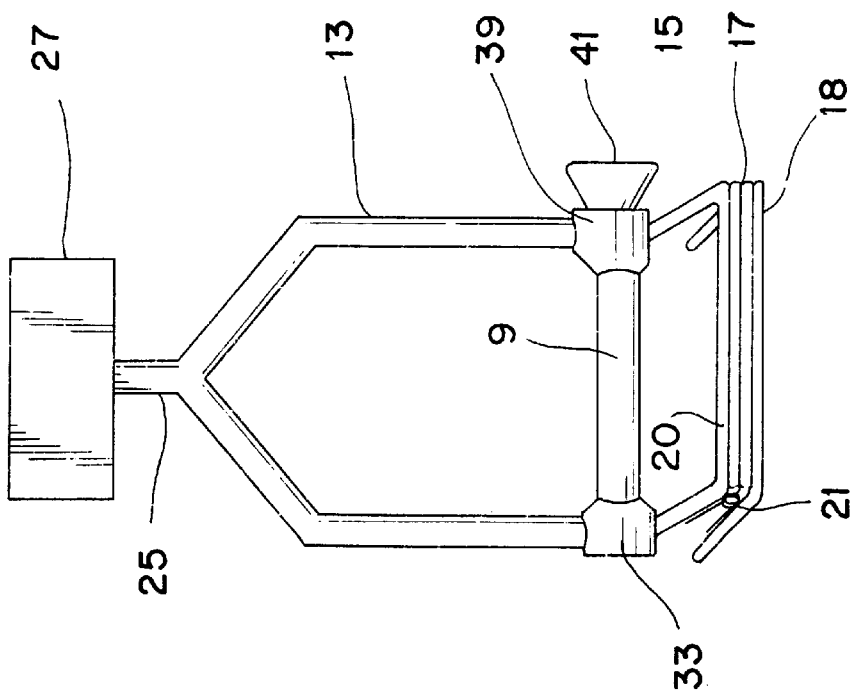
FIG. 4 shows a front view of the supporting frame structure for the dispenser without the tippet spools thereon.

FIG. 4 shows a front view of the supporting frame 13 structure for the dispenser without the three tippet spools thereon and without the decorative button pattern 28. This view is essentially what was shown in FIG. 1 and the same parts have the same numbers. It is important to note the relative size of the tippet dispensers with respect to a user and their clothing. The total overall length of the dispenser from the top surface of button to the bottom of the opposite frame ends 33 and 39 is less than 10 centimeters or 2.5 inches meaning the apparatus may be very conveniently carried and attached to user without interfering with normal fishing or other activities.

FIG. 5 is a side perspective view of the FIG. 4 frame. This view is similar to FIG. 2 without the three tippet retaining spools, tippets and button clip 29. Again this illustrates how the two opposite side spring load clips 19 and 21 hold the two extending separate U-shaped frame ends 18 and 20 together with the rubber stopper strips 17 between them.

In one embodiment the described components had the following dimensions: for shaft 9, length 5.5 cm, diameter 8 mm; for U-shaped frame 13, two frame 3 mm legs separated by 4 cm, with a straight leg length of 4.5 cm, with the upper portion 25 having a length of 1 cm; for tippet holder member 15, a width of 4 cm; and for side springs 19 and 21, a length of 1.5 cm. Clearly other dimensions are possible as well as using a different number of tippet containing spools 11.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An apparatus for dispensing tippet comprising:

a main tippet support frame structure having two separated leg members a common shaft mounted to and extending between said two frame leg members;

a tippet holder frame extension attached to extend from the two separate main frame leg members;

a tippet retaining member mounted on said tippet holder frame for retaining tippets in a separate manner; and a plurality of separate spools mounted on said shaft each of which contains a different cross sectional diameter tippet whose free end extends from its spool such that the end can be held by said tippet retaining member.

2. The apparatus as claimed in claim 1, wherein said tippet support frame structure has a common joined upper frame section on which a button with a clothing attachable member is affixed to.

3. The apparatus as claimed in claim 2, wherein each of said separate spools have substantially the same outer diameter and said button has a decorative pattern on its facing surface opposite the surface with the clothing attachable member.

4. The apparatus as claimed in claim 3, wherein said tippet holder frame extension includes two separate upper leg frame members each of which leg members is attached to one of the main frame's two separate frame leg members, said tippet holder also having a joining transverse upper frame member to join together its two upper leg members.

5. The apparatus as claimed in claim 4, further including a lower U-shaped frame forming part of the tippet extension holder frame, said lower frame member being joined to the legs of the upper frame members by biasing means with said tippet retainer positioned between the joining transverse frame members of the upper frame and the bight portion of the lower U-shaped frame.

6. The apparatus as claimed in claim 5, wherein said tippet retainer includes two flexible strips between which the tippet ends from the different spools may be inserted to retain and separate the tippets from each other.

* * * * *